(12) United States Patent
Sakai et al.

(10) Patent No.: US 8,409,754 B2
(45) Date of Patent: Apr. 2, 2013

(54) POSITIVE ELECTRODE ACTIVE MATERIAL FOR SECONDARY CELL AND NONAQUEOUS ELECTROLYTE SECONDARY CELL USING THE SAME, AND METHOD FOR ANALYSIS OF POSITIVE ELECTRODE ACTIVE MATERIAL FOR SECONDARY CELL

(75) Inventors: Ryo Sakai, Yokohama (JP); Yasuhiro Shirakawa, Yokohama (JP); Hajime Takeuchi, Yokohama (JP); Yasumasa Ooya, Shizuoka-ken (JP); Koshin Tanaka, Yokohama (JP); Kazuki Amemiya, Fujieda (JP); Shouta Endou, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 11/812,585

(22) Filed: Jun. 20, 2007

(65) Prior Publication Data

US 2007/0253892 A1 Nov. 1, 2007

Related U.S. Application Data

(62) Division of application No. 10/479,975, filed as application No. PCT/JP02/06326 on Jun. 25, 2002, now abandoned.

(30) Foreign Application Priority Data

Jun. 27, 2001 (JP) ................................. 2001-195174

(51) Int. Cl.
*H01M 4/505* (2010.01)
*H01M 4/525* (2010.01)
*B01J 8/02* (2006.01)

(52) U.S. Cl. ................... 429/231.1; 429/231.3; 423/659

(58) Field of Classification Search ............... 429/231.1, 429/231.3; 423/659
See application file for complete search history.

(56) References Cited

U.S. PATENT DOCUMENTS 6,811,923 B1 * 11/2004 Sakai et al. ................... 429/209

FOREIGN PATENT DOCUMENTS

| JP | 10-112306 A | 4/1998 |
| JP | 11-135119 A | 5/1999 |
| JP | 11-149925 A | 6/1999 |
| JP | 11-162465 A | 6/1999 |
| JP | 11-216425 A | 8/1999 |
| JP | 2000-12031 A | 1/2000 |
| JP | 2000-58054 A | 2/2000 |
| JP | 2002-75460 A | 3/2002 |
| WO | WO 00/79621 A1 | 12/2000 |

* cited by examiner

*Primary Examiner* — Tracy Dove
(74) *Attorney, Agent, or Firm* — Foley & Lardner LLP

(57) ABSTRACT

A positive electrode active material for use in a non-aqueous electrolyte secondary cell comprises a powdery metal oxide ($LiCoO_2$, $LiNiO_2$, $LiMn_2O_4$ or the like). When the positive electrode active material is classified with a classification precision index κ of 0.7 or greater so as to obtain a coarse powder having a classification ratio in a range of 0.1% to 5%, a ratio (B/A) of the content (B) of an impurity metal element in the coarse powder obtained by the classification to the content (A) of the impurity metal element in the powder before the classification is 1.5 or less. The contents of the impurity metal elements are compared with respect to Ca, Mn, Fe, Cr, Cu, Zn and the like (exclusive of the metal element constituting the powdery metal oxide). The positive electrode active material for a secondary cell serves to improve cell performance capabilities and production yields.

10 Claims, 4 Drawing Sheets

US 8,409,754 B2

POSITIVE ELECTRODE ACTIVE MATERIAL FOR SECONDARY CELL AND NONAQUEOUS ELECTROLYTE SECONDARY CELL USING THE SAME, AND METHOD FOR ANALYSIS OF POSITIVE ELECTRODE ACTIVE MATERIAL FOR SECONDARY CELL

CROSS-REFERENCE TO RELATED PATENT APPLICATIONS

The present application is a divisional of U.S. application Ser. No. 10/479,975, filed Dec. 12, 2003, which is the national stage application of PCT/JP02/06326, filed Jun. 25, 2002, the entire contents of both applications are incorporated herein by reference.

This application is based upon and claims the benefit of priority from the prior Japanese Patent Application No. 2001-195174 filed Jun. 27, 2001, the entire contents of which are incorporated herein by reference.

TECHNICAL FIELD

The present invention relates to a positive electrode active material to be used for a non-aqueous electrolyte secondary cell such as a lithium-ion secondary cell, a non-aqueous electrolyte secondary cell using it, and a method for analysis of a positive electrode active material for a secondary cell.

BACKGROUND ART

In recent years, portable electronic equipment such as notebook computers, personal digital assistants (PDAs), cellular phones and camcorders are becoming popular increasingly. Accordingly, a secondary cell used as the power supply for the portable electronic equipment is highly demanded to be small and have high capacity, high cyclic lifetime and the like. A known secondary cell satisfying such demands is, for example, a lithium-ion secondary cell using a non-aqueous electrolyte containing lithium salt.

For such a lithium-ion secondary cell, a lithium-containing transition metal composite oxide such as $LiCoO_2$, $LiNiO_2$, $LiMn_2O_4$ are used as a positive electrode active material. A carbon-based material is used for a negative electrode, and an electrolyte having lithium salt such as $LiPF_6$ or $LiBF_4$ dissolved into a nonaqueous solvent is used as a non-aqueous electrolyte.

The lithium-ion secondary cell has characteristics that its energy density is higher as compared with a conventionally used Ni—Cd cell or Ni-MH secondary cell and far superior in view of safety to a secondary cell using lithium metal. Thus, a large quantity of lithium-ion secondary cell is being used as the power supply for portable electronic equipment.

For example, a positive electrode using a positive electrode active material such as $LiCoO_2$ or $LiNiO_2$ is produced as follows. First, a mixture of cobalt oxide or nickel hydroxide and lithium carbonate, lithium hydroxide or the like is calcined in the air or oxygen at a temperature of about 600 to 1000° C. to produce a composite oxide. The bulk composite oxide is pulverized into sizes of several micrometers to several tens of micrometers and further classified by screening or the like, if necessary. The composite metal oxide powder obtained as described above is suspended together with a conductive agent and a binder into an appropriate solvent to prepare a slurry, which is then applied onto a collector (metal foil) and dried to form a thin plate so to produce a positive electrode (see Japanese Patent Laid-Open Applications No. 11-135119 and No. 11-149925).

But, the lithium-ion secondary cell using the above-described conventional positive electrode has a disadvantage that a faulty voltage drop tends to occur at the time of initial charging, resulting in that a production yield drops, battery performance lowers, or the like. Such phenomena were studied to find that a particulate metal impurity is often included in the positive electrode active material produced by a conventional production method, resulting in causing problems. The particulate metal impurity was mingled in a quite small amount, which was such a small amount not causing a problem even when the content of an impurity metal element in the positive electrode active material as a whole was analyzed. Therefore, such inclusion was not found by a conventional production process or analyzing method.

An object of the invention provides a positive electrode active material for a secondary cell that allows to increase a production yield of a non-aqueous electrolyte secondary cell and improves cell performance by establishing a method for analysis and evaluation of factors (such as a particulate metal impurity) that lower the cell performance and production yield. Another object of the invention is to provide a non-aqueous electrolyte secondary cell using such a positive electrode active material. Still another object of the invention is to provide a method for analysis of a positive electrode active material for a secondary cell that can analyze and evaluate factors which lower the cell performance and production yield.

SUMMARY OF THE INVENTION

The inventors of the present application have made research and study on a relationship between a particulate metal impurity mingled into the above-described positive electrode active material and a fraction defective (especially, an infant mortality rate) of a secondary cell, and found that a correlation between the content of an impurity metal element analyzed in the entire positive electrode active material and a fraction defective of the secondary cell can not be found because the mingled amount of the particulate metal impurity is very small in the positive electrode active material as a whole.

Meanwhile, it was found that the content of the impurity metal element in the coarse powder is closely related to a fraction defective by separating coarse powder from the positive electrode active material with high precision and analyzing the content of the impurity metal element contained in the coarse powder. In other words, the particulate metal impurity is concentrated into the coarse powder by classifying the positive electrode active material with high precision through the use of a difference in particle diameter and density of the particles constituting it. And, it was found that the content of the concentrated metal impurity element (the content of the impurity metal element in the coarse powder) is closely related to a fraction defective of the secondary cell.

The present invention is based on the above findings. The positive electrode active material for a secondary cell of the invention is a positive electrode active material comprising a powdery metal oxide used for a non-aqueous electrolyte secondary cell and characterized in that, when the powdery metal oxide is classified through the use of a difference in particle diameter and density of its component particles to obtain coarse powder having a classification ratio in a range of 0.1 to 5%, a ratio (B/A) of the content B of an impurity metal element in the coarse powder obtained by the classification to the content A of an impurity metal element in the powdery metal oxide before the classification is 1.5 or below.

As described above, the positive electrode active material for a secondary cell has, for example, metal impurities mingled therein, resulting in occurrence of problems. Especially, a particulate metal impurity (e.g., high density particles) having a relatively large particle diameter is easily eluted by a high potential of the positive electrode when the secondary cell is initially charged. When the eluted metal ions are reduced and deposited on the negative electrode side, the deposit breaks through the separator to cause a micro-short circuit with the positive electrode.

The particulate metal impurity, which tends to dissolve and deposit in the electrolyte, becomes a cause of a failure when it is contained in the positive electrode even if its content is on the order of several ppm. But, according to the present method for analysis of metal impurities, an analysis error is mostly on the order of several ppm and buried in the background of impurities (e.g., impurities contained at an atomic level into a crystal) inherently contained uniformly in a material for the positive electrode, such as Co material, so that the particulate metal impurity cannot be detected. Conversely, even if the total amount of the contents of an impurity metal element is enormous, there is a possibility that a failure does not occur if coarse impurity particles (a particulate metal impurity) are not contained.

According to the present invention, as a method for analysis and evaluation of the content of the particulate metal impurity which is hardly detected by an ordinary method for analysis, there is applied a method which classifies a positive electrode active material (powdery composite metal oxide) with high precision and compares the content B of an impurity metal element (metal element adversely affecting on the operation and characteristics of a secondary cell) in the obtained coarse powder with the content A of an impurity metal element in the positive electrode active material before the classification. Specifically, the particulate metal impurity is concentrated on the coarse powder side by classifying the positive electrode active material with high precision. Therefore, the content of the particulate metal impurity in the positive electrode active material can be evaluated by comparing the impurity content B in the coarse powder having concentrated the particulate metal impurity with the impurity content (impurity content before the classification) A as the whole positive electrode active material.

Specifically, when the ratio (B/A) of the impurity content B in the coarse powder to the impurity content (impurity content before the classification) A as the whole positive electrode active material is 1.5 or below, the production yield and cell performance of the non-aqueous electrolyte secondary cell produced by using such a positive electrode active material can be enhanced. In other words, when the ratio B/A of the content of the impurity metal element is 1.5 or below, it means that the content of the particulate metal impurity in the positive electrode active material is adequately reduced. Therefore, when the positive electrode active material is used to produce a non-aqueous electrolyte secondary cell, the occurrence of a micro-short circuit resulting from the deposition of impurity metal ions at the initial charging can be prevented. Thus, the non-aqueous electrolyte secondary cell excelling in cell performance and having high production yield can be provided with a high reproducibility.

The positive electrode active material for a secondary cell of the invention is characterized in that the powdery metal oxide is classified to have a classification precision index κ of 0.7 or greater. The classification precision index κ will be described in detail later. The powdery metal oxide is classified in the classification precision index κ to obtain coarse powder having a classification ratio in a range of 0.1 to 5%, and it becomes possible to concentrate the particulate metal impurity into the coarse powder with high precision. Therefore, the content of the impurity metal element in the coarse powder becomes having a significant effect on a fraction defective of the secondary cell, so that the production yield and cell performance of the non-aqueous electrolyte secondary cell can be enhanced more effectively by suppressing the impurity content low.

In the positive electrode active material for a secondary cell of the present invention, a metal element adversely affecting on the operation and characteristics of the secondary cell is selected for the impurity metal element whose content is compared between the powdery composite metal oxide before the classification and the coarse powder obtained by the classification. Specifically, it is preferable to compare at least one kind of element (excepting the metal elements constituting the powdery metal oxide) selected from Mg, Ca, Ba, Sr, Sc, Y, Ti, Zr, Hf, V, Cr, Nb, Mo, Ta, W, Mn, Fe, Co, Ni, Cu, Zn, Ga, Ge, Tc, Ru, Rh, Pd, Ag, Cd, In, Sn, Sb, Re, Os, Ir, Tl, Pb and Bi. These impurity metal elements are compared as the content of each single element between the powdery metal oxide before the classification and the coarse powder obtained by the classification.

The non-aqueous electrolyte secondary cell of the invention comprises a positive electrode containing the positive electrode active material for a secondary cell of the invention, a negative electrode disposed with the positive electrode through a separator, a cell casing for housing the positive electrode, the separator and the negative electrode, a non-aqueous electrolyte charged into the cell casing. The production yield and cell performance can be improved by the above non-aqueous electrolyte secondary cell.

The method for analysis of a positive electrode active material for a secondary cell of the invention is a method for analysis of a positive electrode active material comprising a powdery metal oxide to be used for a non-aqueous electrolyte secondary cell, having a step of obtaining coarse powder having a classification ratio in a range of 0.1 to 5% by classifying the powdery metal oxide through the use of a difference in particle diameter and density of its component particles, a step of measuring the content A of an impurity metal element in the powdery metal oxide before the classification and the content B of an impurity metal element in the coarse powder obtained by the classification, and a step of evaluating the amount of the particulate metal impurity contained in the powdery metal oxide before the classification based on a ratio (B/A) of the content B of the impurity metal element to the content A of the impurity metal element.

BEST MODE FOR CARRYING OUT THE INVENTION

Figure 1:
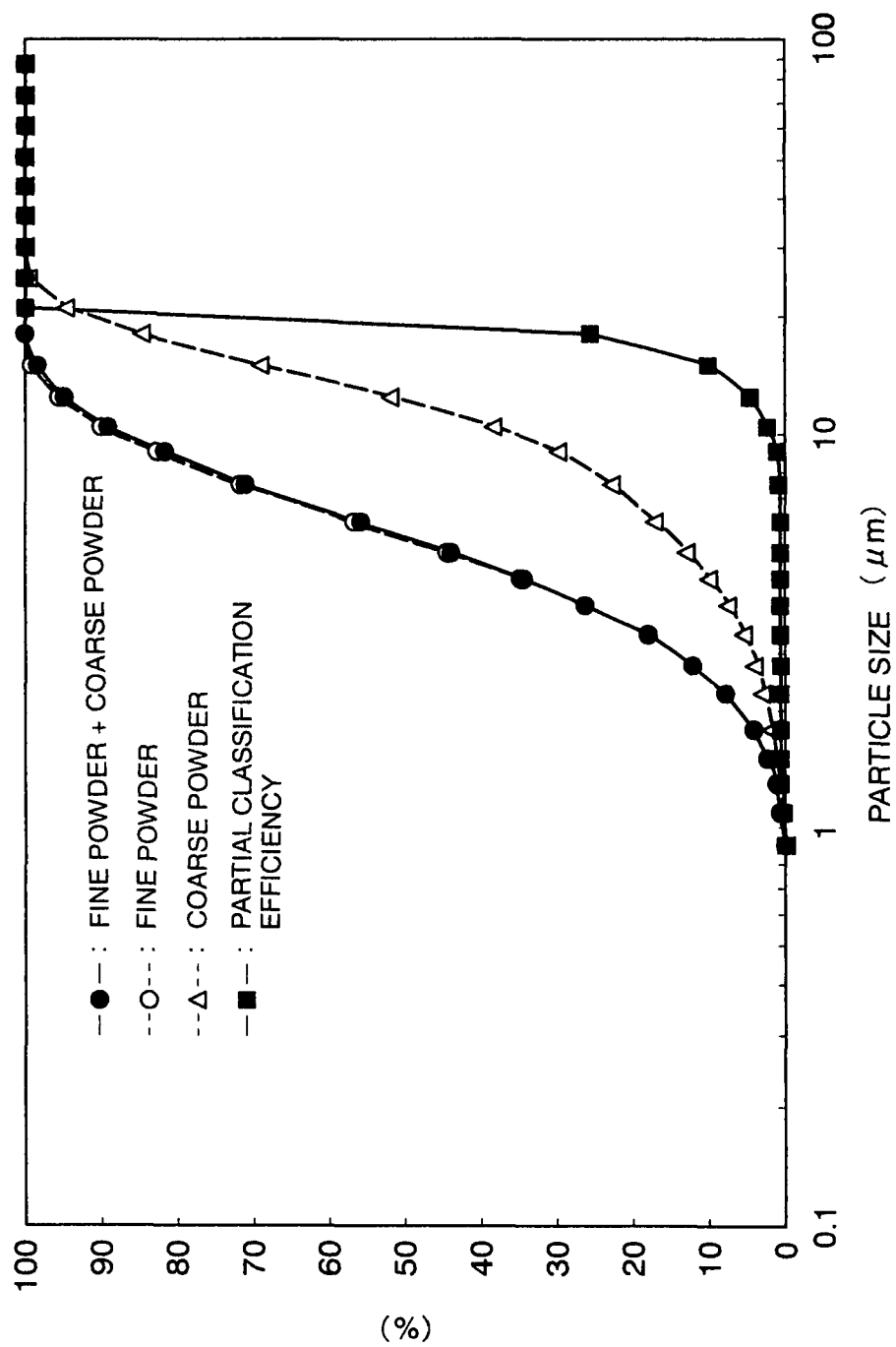
FIG. 1 is a diagram showing an accumulation frequency and partial classification efficiency of each powder before and after classification evaluation of the positive electrode active material (sample 1) according to Embodiment 1 of the invention.

Embodiments for conducting the invention will be described below.

The positive electrode active material for a secondary cell of the invention is used for a positive electrode of a non-aqueous electrolyte secondary cell such as a lithium-ion secondary cell. For example, a metal oxide such as a lithium-containing composite metal oxide is used for the positive electrode active material. The lithium-containing composite metal oxide includes a lithium-cobalt composite oxide, a lithium-nickel composite oxide, a lithium-manganese composite oxide, and their composite or mixed oxides.

The lithium-cobalt composite oxide and the lithium-nickel composite oxide is basically denoted by $LiAO_2$ (A is at least one kind of element selected from Co, Ni and Mn), but a ratio between Li and Co or Ni may be deviated from a stoichiometric composition, and an amount of oxygen is also not limited to a stoichiometric composition. Part (e.g., 10 atomic % or below) of the A element such as Co or Ni can be substituted by a transition metal element such as Sn, Al, V, Cr or Fe.

The lithium-manganese composite oxide is basically indicated by $LiB_2O_4$ (B is an element containing at least Mn selected from Mn, Co and Ni), but a ratio between Li and Mn may be deviated slightly from the stoichiometric composition, and the amount of oxygen is also not limited to the stoichiometric composition. Part (e.g., 10 atomic % or below) of the B element such as Mn may be substituted by a transition metal element such as Fe, Sn, Al, V, Cr or Ni.

Specifically, as a positive electrode active material, at least one kind of composite metal oxide selected from the following general formulae:

$$LiA_aO_x$$ 

(where, A denotes at least one kind of element selected from Co, Ni and Mn, and a and x are numerals falling in a range of $0.8 \leq a \leq 1.1$, $1.6 \leq x \leq 2.4$. But, 10 atomic % or below of the A element can be substituted by a transition metal element such as Sn, Al, V, Cr or Fe); and $$LiB_bO_y$$ 

(where, B denotes an element containing at least Mn selected from Mn, Co and Ni, and b and y are numerals falling in a range of $1.5 \leq b \leq 2.1$, $3.6 \leq y \leq 4.4$. But, 10 atomic % or below of the B element can be substituted by a transition metal element such as Fe, Sn, Al, V, Cr or Ni.)

The above-described composite metal oxide is pulverized and used as a positive electrode active material. In the positive electrode active material made of the powdery composite metal oxide (composite metal oxide powder), the positive electrode active material for a secondary cell of this embodiment has characteristics satisfying the impurity content described below when the content of the particulate metal impurity is evaluated according to the analysis and evaluation method to be described later in detail. Specifically, as the results of conducting the analysis and evaluation according to the invention, when the content A of the impurity metal element in the positive electrode active material (a powdery composite metal oxide as a whole) before the classification and the content B of the impurity metal element in coarse powder with a classification ratio of 0.1 to 5% are compared, it is a positive electrode active material made of a powdery composite metal oxide with a ratio (B/A) of the impurity content of 1.5 or below.

The method for analysis and evaluation of a particulate metal impurity in the positive electrode active material of the invention will be described in detail below. The analysis method of the invention first classifies a positive electrode active material made of a powdery composite metal oxide through the use of a difference in particle diameter and density of the component particles to obtain coarse powder with a classification ratio in a range of 0.1 to 5%. This classification is strictly performed for analysis and evaluation of the content of the particulate metal impurity and different from the classification conventionally performed for adjustment of a particle diameter of the positive electrode active material, namely the classification for removal of coarse powder or fine powder from the pulverized positive electrode active material. The positive electrode active material is formed of the whole powdery composite metal oxide before the classification. In other words, the positive electrode active material of this embodiment is made of the whole powder containing the classified coarse powder and other particles (formally called as the fine powder).

For the method of analyzing and evaluating the positive electrode active material, a classification method capable of classifying powder with high precision is applied. Specifically, sieving is used for simple classification, but a sieve cannot classify a fine powder material having an average particle diameter in a range of approximately several micrometers to several tens micrometers, which is used for the positive electrode active material, with high precision. Therefore, the analysis and evaluation method of the invention classifies through the use of a fact that the resistance of particles against a physical force such as gravity, inertia force or centrifugal force is variable depending on a particle diameter or a density of the particles. Specifically, it is desirable to apply airflow classification for classifying on the basis of a balance between gravity, inertia force or centrifugal force and fluid resistance.

The airflow classification can treat powder in a large amount, it is industrially suitable and can classify on the basis of a particle diameter and a density (mass) of the particles. Therefore, it is preferably used for the analysis and evaluation method of a particulate metal impurity of the invention. Here, typical examples of the airflow classification include the classification utilizing a balance between centrifugal force due to a free vortex and fluid resistance, the classification utilizing a balance between the centrifugal force due to a forced vortex and fluid resistance, and the like.

A classification device utilizing the centrifugal force of a free vortex such as a cyclone may not enhance classification precision to an adequate level because a dispersion force is weak. Meanwhile, a classifier, such as a Micron Separator, a Turboplex, an AccuCut or a Turbo-classifier, which classifies based on a balance between the centrifugal force by a forced vortex and fluid resistance, is preferable as the classifier to be used particularly for the analysis and evaluation method of a particulate metal impurity of the invention because a dispersion force is high, damage to the particles is small, and the classification precision is remarkable.

According to the method for analysis and evaluation of a positive electrode active material, the above-described classifier (particularly, a classifier using a balance between the centrifugal force by a forced vortex and the fluid resistance) is used to classify the positive electrode active material so as to have, for example, a classification precision index κ of 0.7 or more so as to obtain coarse powder with a classification ratio (mass ratio) in a range of 0.1 to 5%. When the coarse powder with a classification ratio in a range of 0.1 to 5% is obtained, the particulate metal impurity can be effectively and practically concentrated to the coarse powder side. By comparing the content of the metal impurity element between the coarse powder having the particulate metal impurity concentrated and the positive electrode active material before the classification, the content of the particulate metal impurity in the entire positive electrode active material can be practically evaluated with high precision.

Specifically, the particulate metal impurity which is easily dissolved and deposited into the electrolyte becomes a cause of a failure when it is contained in the positive electrode even if its content is on the order of several ppm. But, an ordinary metal impurity analysis method (quantitative analysis) according to the ICP method or the like cannot accurately detect only the amount of the particulate metal impurity because an analysis error is on the order of several ppm. Conversely, even if the total sum of the contents of the impurity metal element is large, a failure may not occur when the particulate metal impurity is not contained. Meanwhile, when the positive electrode active material is classified to obtain coarse powder with a classification ratio in a range of 0.1 to 5%, the particulate metal impurity which is hardly detected by the ordinary analysis method can be concentrated into the classified coarse powder. Therefore, the content B of the metal impurity element in the classified coarse powder can be compared with the content A of the metal impurity element in the positive electrode active material before the classification to evaluate the content of the particulate metal impurity in the entire positive electrode active material.

When the positive electrode active material is classified as described above, the fine powder is contained in a large amount in the coarse powder if the coarse powder has a classification ratio exceeding 5%, and the particulate metal impurity cannot be concentrated adequately. Therefore, even if the content B of the metal impurity element in the coarse powder and the content A of the metal impurity element in the entire positive electrode active material are compared, the ratio (B/A ratio) of the impurity content closely related to a fraction defective of a secondary cell cannot be obtained. Meanwhile, when the classification ratio is less than 0.1%, it is not preferable because a great deal of classification treatments are required to obtain a sample to be measured for determination of a ratio (B/A ratio) of the impurity content closely related to a fraction defective of the secondary cell, namely a sample to be measured in an amount required for the analysis of composition. It is further desirable that the classification ratio of the coarse powder falls in a range of 1 to 3% to enhance the practicality of comparing the impurity content B in the coarse powder and the impurity content A in the entire positive electrode active material.

The positive electrode active material is preferably classified so to have a classification precision index κ of 0.7 or more. If the classification precision index κ is less than 0.7, it means that separation precision of the coarse powder is low, and the particle size distribution of the coarse powder becomes broad. Such coarse powder cannot be used to adequately concentrate the particulate metal impurity, and the interrelationship between the ratio (B/A ratio) of the impurity content and the fraction defective of the secondary cell becomes weak. Therefore, even the positive electrode active material having the B/A ratio in a prescribed range may not able to adequately reduce the fraction defective of the secondary cell. It is more desirable that the classification precision index κ is 0.8 or higher. When the classification precision index κ is high, it means that the particulate metal impurity is concentrated to a higher level, so that the particulate metal impurity amount in the entire positive electrode active material is small as the impurity content in such a highly concentrated state is lower.

Here, the classification precision index κ is determined as follows. Specifically, partial classification efficiency η(d) is first determined according to the following expression (1) below. The partial classification efficiency η(d) is determined from a particle size distribution of each powder and indicates a recovery rate in individual sections which are obtained by dividing continuously variable particle diameters into such sections.

$$\eta(d) = \frac{\eta c\{Rc(di) - Rc(di+1)\}}{Ro(di) - Ro(di+1)}$$

where,
di, di+1: i-st, i+1st particle diameter (μm)
$R_c(di)$, $R_c(di+1)$: mass cumulative frequency of coarse powder (mass %)
$R_0(di)$, $R_0(di+1)$: mass cumulative frequency of powder before classification (mass %)
$\eta_c$: yield of coarse powder (a classification ratio) (mass %)
η(d): partial classification efficiency (mass %)

The expression (1) is shown as a partial classification efficiency curve indicating that classification precision is high as the curve has a sharp (large) inclination. The classification precision index κ is a value of quantified classification precision and determined from a particle diameter ($D_{p25}$(μm)) when the partial classification efficiency is 25% and a particle diameter ($D_{p75}$(μm)) when the partial classification efficiency is 75% by the following expression (2).

$$\kappa = D_{p25}/D_{p75} \qquad (2)$$

In this case, the classification precision index κ becomes a value smaller than 1, and it means that the classification precision becomes high as the value becomes closer to 1.

Figure 2:
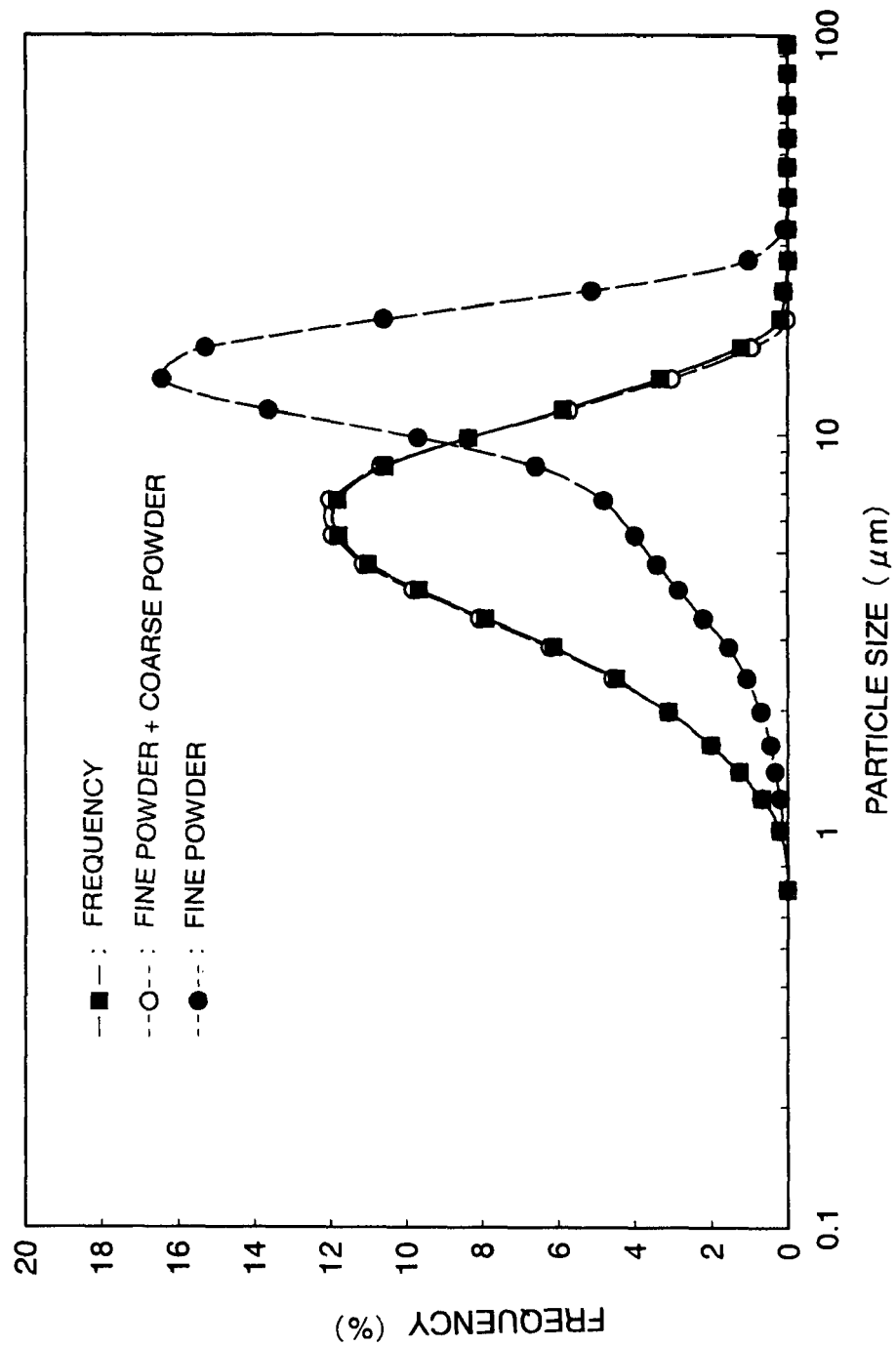
FIG. 2 is a diagram showing particle size distribution of each powder before and after the classification evaluation of the positive electrode active material (sample 1) according to Embodiment 1 of the invention.
Figure 3:
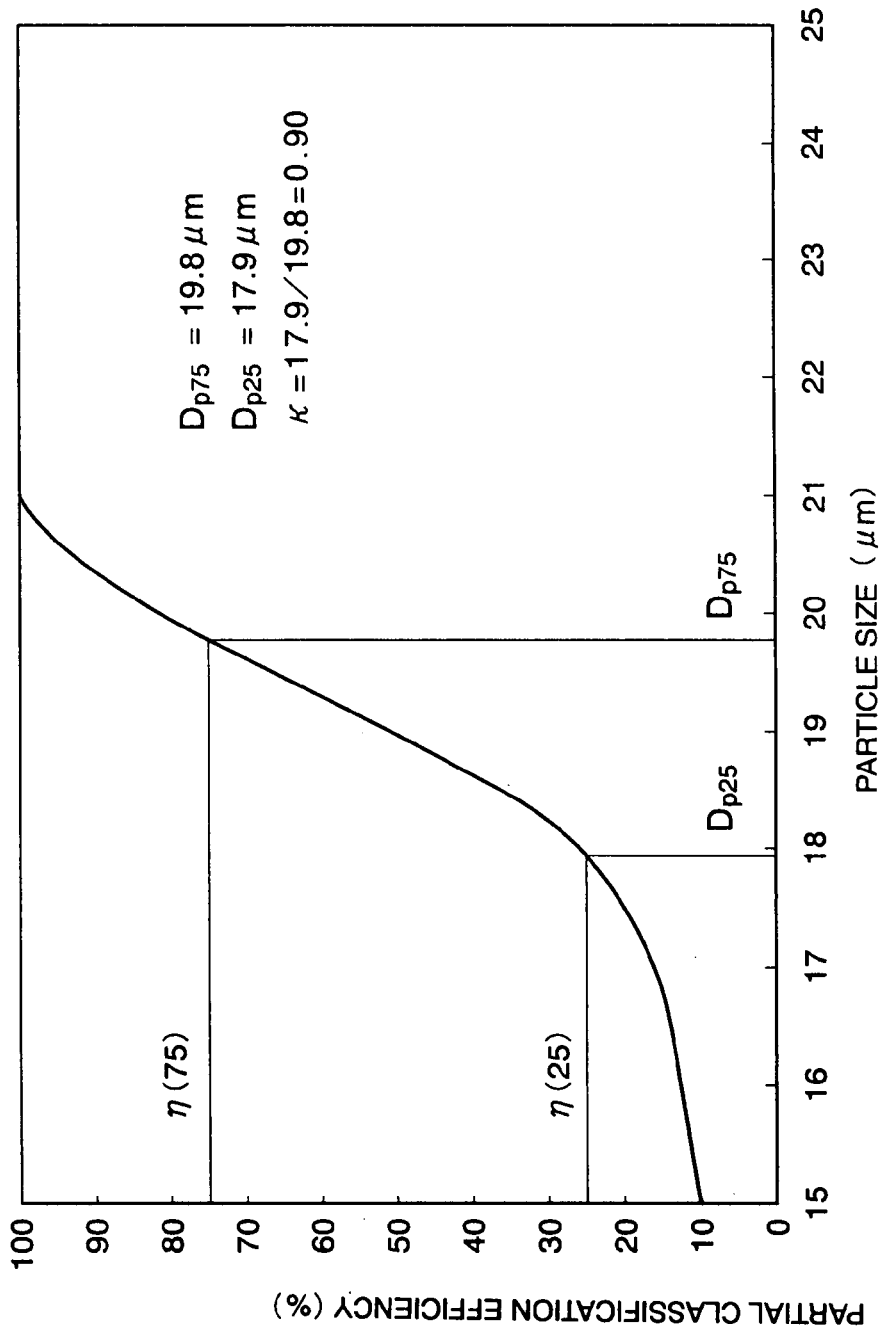
FIG. 3 is a diagram showing a relationship between a partial classification efficiency and a particle diameter prepared for determination of a classification precision index by the classification evaluation of the positive electrode active material (sample 1) according to Embodiment 1 of the invention.

Examples of the results (the classified results of sample 1 of Example 1 described later) of actual classification of a positive electrode active material ($LiCoO_2$) will be shown in Table 1, Table 2, FIG. 1, FIG. 2 and FIG. 3. The positive electrode active material was classified by using the Turbo-classifier as an air classifier, and the classification condition was adjusted so that the ratio of coarse powder to fine powder became 2:98 (a classification ratio of the coarse powder=2%). At this time, the volume of air was maximum of the device in order to enhance a dispersion force, and a classification ratio was adjusted by a rotor speed.

TABLE 1

| Particle diameter (μm) | Accumulation frequency (%) | | | | Partial classification efficiency (%) |
|---|---|---|---|---|---|
| | A 100 | B 2 | C 98 | D (100) | |
| 0.5-0.9 | 0 | 0.53 | 0 | 0.01 | 0 |
| 0.9-1.1 | 0.34 | 0.78 | 0.27 | 0.28 | 1.85 |
| 1.1-1.3 | 1.02 | 1.03 | 0.95 | 0.95 | 0.74 |
| 1.3-1.5 | 2.00 | 1.30 | 1.97 | 1.96 | 0.54 |
| 1.5-1.8 | 3.96 | 1.76 | 4.06 | 4.01 | 0.45 |
| 1.8-2.2 | 7.31 | 2.54 | 7.66 | 7.56 | 0.44 |
| 2.2-2.6 | 11.38 | 3.53 | 12.02 | 11.85 | 0.46 |
| 2.6-3.1 | 17.20 | 5.06 | 18.23 | 17.97 | 0.50 |
| 3.1-3.7 | 24.90 | 7.25 | 26.35 | 25.97 | 0.54 |
| 3.7-4.3 | 32.95 | 9.69 | 34.74 | 34.24 | 0.59 |
| 4.3-5 | 42.23 | 12.63 | 44.30 | 43.67 | 0.62 |

TABLE 1-continued

| Particle diameter (μm) | Accumulation frequency (%) | | | | Partial classification efficiency (%) |
|---|---|---|---|---|---|
| | A 100 | B 2 | C 98 | D (100) | |
| 5-6 | 54.48 | 16.76 | 56.75 | 55.95 | 0.67 |
| 6-7.5 | 69.69 | 22.86 | 72.00 | 71.02 | 0.81 |
| 7.5-9 | 80.89 | 29.69 | 83.02 | 81.95 | 1.25 |
| 9-10.5 | 88.53 | 38.18 | 90.33 | 89.29 | 2.32 |
| 10.5-12.5 | 94.67 | 51.72 | 95.96 | 95.08 | 4.68 |
| 12.5-15 | 98.42 | 68.74 | 99.07 | 98.46 | 10.05 |
| 15-18 | 99.91 | 84.55 | 100.00 | 99.69 | 25.76 |
| 18-21 | 100.00 | 93.85 | 100.00 | 99.88 | 100 |
| 21-25 | 100.00 | 98.96 | 100.00 | 99.98 | 100 |
| 25-30 | 100.00 | 100.00 | 100.00 | 100.00 | 100 |
| 30-36 | 100.00 | 100.00 | 100.00 | 100.00 | — |
| D10 | 2.46 | 4.37 | 2.41 | — | |
| D50 | 5.63 | 12.25 | 5.56 | — | |
| D90 | 10.98 | 19.76 | 10.43 | — | |
| D99 | 16.17 | 25.17 | 14.94 | — | |

A: Before classification
B: Classified coarse powder
C: Classified fine powder
D: Coarse powder + fined powder

TABLE 2

| Central particle diameter(μm) | Frequency (%) | | | |
|---|---|---|---|---|
| | A | B | C | D |
| 0.7 | 0.0 | 0.0 | 0.0 | 0.0 |
| 1 | 0.3 | 0.2 | 0.2 | 0.2 |
| 1.2 | 0.7 | 0.3 | 0.7 | 0.7 |
| 1.4 | 1.2 | 0.3 | 1.3 | 1.2 |
| 1.65 | 1.9 | 0.4 | 2.0 | 2.0 |
| 2 | 2.9 | 0.7 | 3.2 | 3.1 |
| 2.4 | 4.3 | 1.0 | 4.6 | 4.5 |
| 2.85 | 5.8 | 1.5 | 6.2 | 6.1 |
| 3.4 | 7.7 | 2.2 | 8.1 | 8.0 |
| 4 | 9.4 | 2.8 | 9.8 | 9.7 |
| 4.65 | 10.8 | 3.4 | 11.2 | 11.0 |
| 5.5 | 11.9 | 4.0 | 12.0 | 11.9 |
| 6.75 | 12.0 | 4.8 | 12.1 | 11.9 |
| 8.25 | 10.8 | 6.6 | 10.7 | 10.6 |
| 9.75 | 8.7 | 9.7 | 8.4 | 8.4 |
| 11.5 | 6.2 | 13.6 | 5.7 | 5.8 |
| 13.75 | 3.6 | 16.4 | 3.0 | 3.3 |
| 16.5 | 1.4 | 15.2 | 0.9 | 1.2 |
| 19.5 | 0.1 | 10.6 | 0.0 | 0.2 |
| 23 | 0.0 | 5.1 | 0.0 | 0.1 |
| 27.5 | 0.0 | 1.0 | 0.0 | 0.0 |
| 33 | 0.0 | 0.0 | 0.0 | 0.0 |
| Total | 100.0 | 100.0 | 100.0 | 100.0 |

A: Before classification
B: Classified coarse powder
C: Classified fine powder
D: Coarse powder + fined powder Table 1 shows mass cumulative frequency (mass %) of powder before the classification (a positive electrode active material), classified coarse powder, classified fine powder and coarse powder+fine powder. According to the calculation formula of the partial classification efficiency η(d) of the expression (1), mass cumulative particle sizes of raw material $R_0(di)$, $R_0(di+1)$ are used, but when the partial classification efficiency η(d) is calculated based on the expression (1) considering a partial loss of particles at the time of classification or the like, $R_0(di)$ and $R_0(di+1)$ are assumed to use the mass cumulative frequency (mass %) of coarse powder+fine powder for convenience. Thus, the partial classification efficiency of Table 1 was obtained. FIG. 1 is a graph of each cumulative frequency (mass %) and partial classification efficiency (mass %) of Table 1. Table 2 shows the particle size distribution (each particle size frequency (mass %)) of powder before the classification (positive electrode active material), classified coarse powder, classified fine powder and coarse powder+fine powder, and FIG. 2 is a particle size distribution graph based on the particle size and frequency of each powder.

The classification precision index κ of this classification example was calculated according to the above-described expression (2) to find that the classification precision index κ was 0.90, indicating that the coarse powder was classified with high precision. It is also apparent from FIG. 1 and FIG. 2 that the classification precision is high. To calculate the classification precision index κ, the relationship between the partial classification efficiency (%) and the particle size is graphed as shown in FIG. 3, and $D_{p25}$ and $D_{p75}$ are determined from the graph. In this classification example, $D_{p25}$ is 17.9 μm, and $D_{p75}$ is 19.8 μm. Therefore, the classification precision index κ becomes $D_{p25}/D_{p75}=17.9/19.8=0.90$.

The particle size distribution of the powder before the classification and the classified powder according to the invention indicates the values measured by means of a MICROTRAC II PARTICLE-SIZE ANALYZER manufactured by LEEDS & NORTHRUP using a light scattering phenomenon which occurs when a laser beam is exposed to the particles. And, the content of the impurity metal element in each powder indicates the value measured by ICP analysis method after dissolving a sample to be measured in hydrochloric acid or the like.

The positive electrode active material for a secondary cell of this embodiment is characterized in that, when the positive electrode active material is classified under the above-described conditions, a ratio (B/A) of the content B of an impurity metal element in the coarse powder obtained by the classification to the content A of an impurity metal element in the positive electrode active material (the whole powdery composite metal oxide before the classification) is 1.5 or below. The positive electrode active material of the invention is not limited to its production method, but when the ratio (B/A ratio) of the impurity content based on the above-described analysis and evaluation method is 1.5 or below, the structure of the invention is satisfied.

When the ratio (B/A ratio) of the impurity content based on the above-described analysis and evaluation method is 1.5 or below, it means that the content of the particulate metal impurity in the positive electrode active material is reduced appropriately. Therefore, the production of a non-aqueous electrolyte secondary cell by using such a positive electrode active material makes it possible to suppress the occurrence of a micro-short circuit resulting from the deposition of impurity metal ions at the time of initial charging. It is more desirable that the ratio (B/A ratio) of the impurity content in the positive electrode active material when the analysis and evaluation are performed under the above-described conditions is 1.1 or below.

For the impurity metal element whose content is compared between the positive electrode active material before the classification and the coarse powder obtained by the classification, a metal element which adversely affects on the operation and characteristics of a non-aqueous electrolyte secondary cell is selected. The particulate metal impurity containing a metal element other than the metal element constituting the positive electrode active material is eluted as metal ions when the secondary cell is charged for the first time, the eluted metal ions are reduced and deposited on the side of the negative electrode, and the deposit passes through the separator to come into contact with the positive electrode and causes a micro-short circuit or the like.

Therefore, various kinds of metal elements are compared, but it is especially preferable to compare metal elements which tend to be impurity ions, and more specifically at least one kind of element (excepting the metal elements constituting the positive electrode active material) selected from Mg, Ca, Ba, Sr, Sc, Y, Ti, Zr, Hf, V, Cr, Nb, Mo, Ta, W, Mn, Fe, Co, Ni, Cu, Zn, Ga, Ge, Tc, Ru, Rh, Pd, Ag, Cd, In, Sn, Sb, Re, Os, Ir, Tl, Pb and Bi.

The above-described contents A, B of the impurity metal elements are determined on each single element, and the B/A ratio is calculated from the contents A, B of each single metal. Specifically, the content A in the positive electrode active material before the classification and the content B in the coarse powder are determined on the subject impurity metal element, the B/A ratio is calculated from the contents A, B, and when the B/A ratio is 1.5 or below, the positive electrode active material for secondary cell of the present invention is configured.

It is most desirable that the measurement and comparison of the contents A, B of the impurity metal element are performed on all the above-described metal elements and the B/A ratio of all the metal elements satisfy 1.5 or below. But, the cell characteristics and production yield can be improved when the above-described conditions are met by at least the elements which are significantly contained. Besides, simply when the elements such as powder from the worn pulverizer, e.g. Fe, Cr, Cu, Zn, Mg and Ca, which may be mingled in the production process satisfy the above-described conditions, the cell characteristics and production yield can be improved.

As described above, the particulate metal impurity becomes a cause of a faulty voltage drop or the like at the time of initial charging of the secondary cell, so that the positive electrode active material having the content of the particulate metal impurity adequately reduced is provided with reference to the fact that the ratio (B/A ratio) of the impurity content is 1.5 or below according to the invention. Such a positive electrode active material can be used to produce the non-aqueous electrolyte secondary cell to prevent the occurrence of a micro-short circuit due to the deposition of the impurity metal ions at the time of initial charging, so that the battery characteristics and production yield can be improved. In other words, the non-aqueous electrolyte secondary cell is substantially prevented from having the occurrence of a defect in production or an initial failure, and the cell performance can be improved.

The positive electrode active material for a secondary cell having the above-described ratio (B/A ratio) of the impurity content of 1.5 or below can be obtained by, for example, using a raw material having the content of a coarse particulate metal impurity in a low level, adopting a process which retards the mixing of the particulate metal impurity in the production process or removing the coarse impurity particles mingled in the final process. As described above, however, the method of producing the positive electrode active material according to the invention is not limited to a particular one, but one having a ratio (B/A ratio) of the impurity content of 1.5 or below based on the above-described analysis and evaluation method can be used as the positive electrode active material of the invention.

One example of the production method of the positive electrode active material will be described. First, a composite metal oxide containing lithium, such as $LiCoO_2$, $LiNiO_2$ or $LiMn_2O_4$, is composed by a common calcination method. The process of composing the Li-containing composite metal oxide uses a lithium compound and a compound such as cobalt, nickel or manganese as the raw materials, mixes them at a prescribed ratio, and calcines at temperatures of 650 to 950° C. in the atmosphere for example. The compound used as the raw material includes oxide, carbonate, sulfate, nitrate and hydroxide. They are desired to contain little amount of metal impurity. Before the calcination, refinement or the like may be performed in order to remove metal impurities. Besides, it is also effective that cobalt oxide powder and individual raw material powders such as lithium carbonate are mixed at a prescribed ratio after the used raw material is dried at a temperature of 100° C. or higher for one hour or more. Thus, the flowability of the raw material powder is improved, and inclusion of the impurity particles due to abrasion of the mixing device can be retarded.

The Li-containing composite metal oxide (calcined material) obtained by the composing step is pulverized by a pulverizer into, for example, an average particle diameter of 0.5 to 15 μm, more preferably 1 to 10 μm. At this time, it is desirable to use a material which is not worn heavily or a material which does not cause a defect even if worn out for the particle contact portion of the pulverizer so to prevent mixing of a particulate metal impurity. Specifically, it is effective to coat the particle contact portion with ceramics or a resin. It is not necessary to coat all the parts with such a material, but it is effective by applying the coating to only the portions where the particles are contacted at a high speed and the portions where metals make collision with each other.

To pulverize the calcined material, it is effective to use a pulverizer such as a jet mill for pulverizing by mutually colliding the particles. It is also effective to perform the classification and the removal by dissolving with an acid or the like so to remove coarse particles containing the particulate metal impurity after the pulverization and screening for controlling the particles. Then, the content of particulate metal impurity is examined according to the above-described analysis and evaluation method. And, the positive electrode active material for a secondary cell having an impurity content ratio (B/A ratio) of 1.5 or below according the analysis and evaluation method for the particulate metal impurity is mixed with a conductive agent, and a binder and a solvent are added to it to prepare a slurry. The slurry is applied onto a collector (such as a metal foil) and dried by heating to form a thin plate, which is then cut into a prescribed size to obtain a positive electrode of a non-aqueous electrolyte secondary cell.

As described above, the typical steps of producing the positive electrode active material includes four steps, namely a raw material mixing step, a mixture calcining step, a calcined material pulverizing step and a pulverized material classifying step. As one means for preventing an impurity from being mingled, the particle contact portion of each production device is formed of a nonmetal material. But, when all the particle contact portions are made of nonmetal or coated with nonmetal, the cost of the production device becomes high, resulting in the increase of the production cost of the positive electrode active material in industrial viewpoint. And, it is hard to thoroughly prevent the metal impurities from mingling because some metal portions remain exposed. Especially, a typical process of producing the positive electrode active material uses a production device made of a metal material such as stainless steel (SUS) and is in the environment that a metal impurity such as Fe is easily mingled.

Basically, the positive electrode active material for a secondary cell of the invention can be obtained by selecting one having an impurity content ratio (B/A ratio) of 1.5 or below according to the above-described analysis and evaluation method. A preferable example of the production process to positively attain the impurity content ratio (B/A ratio) of 1.5 or below is described below. First, it is desirable to perform the above-described raw material powder drying step. The drying temperature is advised to be 100° C. or more but, if the temperature is excessively high, drying equipment is heavily loaded, so that the drying temperature is preferably set to about 100 to 300° C. The drying time is advised to be one hour or more, and if it is excessively long, the drying equipment is heavily loaded, so that the drying time is desired to be about 1 to 10 hours.

Second, the particle contact portion of the production device is coated with nonmetal. The nonmetal coating material to be used is preferably a ceramic material such as glass, nitride, oxide or carbide or a resin material such as urethane resin, fluorine-based resin, epoxy resin or liquid crystal resin. Especially, the resin coating is suitable.

The positive electrode active material has high hardness, and there are steps such as a pulverizing step and a classifying step where the positive electrode active material collides heavily. Therefore, the coating material such as the ceramics material having low elasticity and high hardness is heavily worn, and it is highly possible that it is scraped off in a short time. When the coating material is worn to reveal the metal parts, there is a possibility that the impurity metal is mixed into the positive electrode active material through the revealed portion, and the scraped ceramics coating material is also mixed into it to cause an adverse effect. Therefore, the elastic resin coating is preferable to the ceramics coating for coating the particle contact portion. Besides, the coating material is preferably heat resistant because some production steps are conducted at a high temperature of 100° C. or higher.

The above-described analysis method of the present invention exerts the effects on analysis and evaluation of the positive electrode active material for a secondary cell, but it is not always limited to the positive electrode active material for a secondary cell but can be applied for analysis and evaluation of the particulate metal impurity contained in various types of powdery materials (e.g., a positive electrode active material for a secondary cell, a powdery electronic functional material containing powder of fluorescent substance).

Then, embodiments of the non-aqueous electrolyte secondary cell according to the invention will be described.

Figure 4:
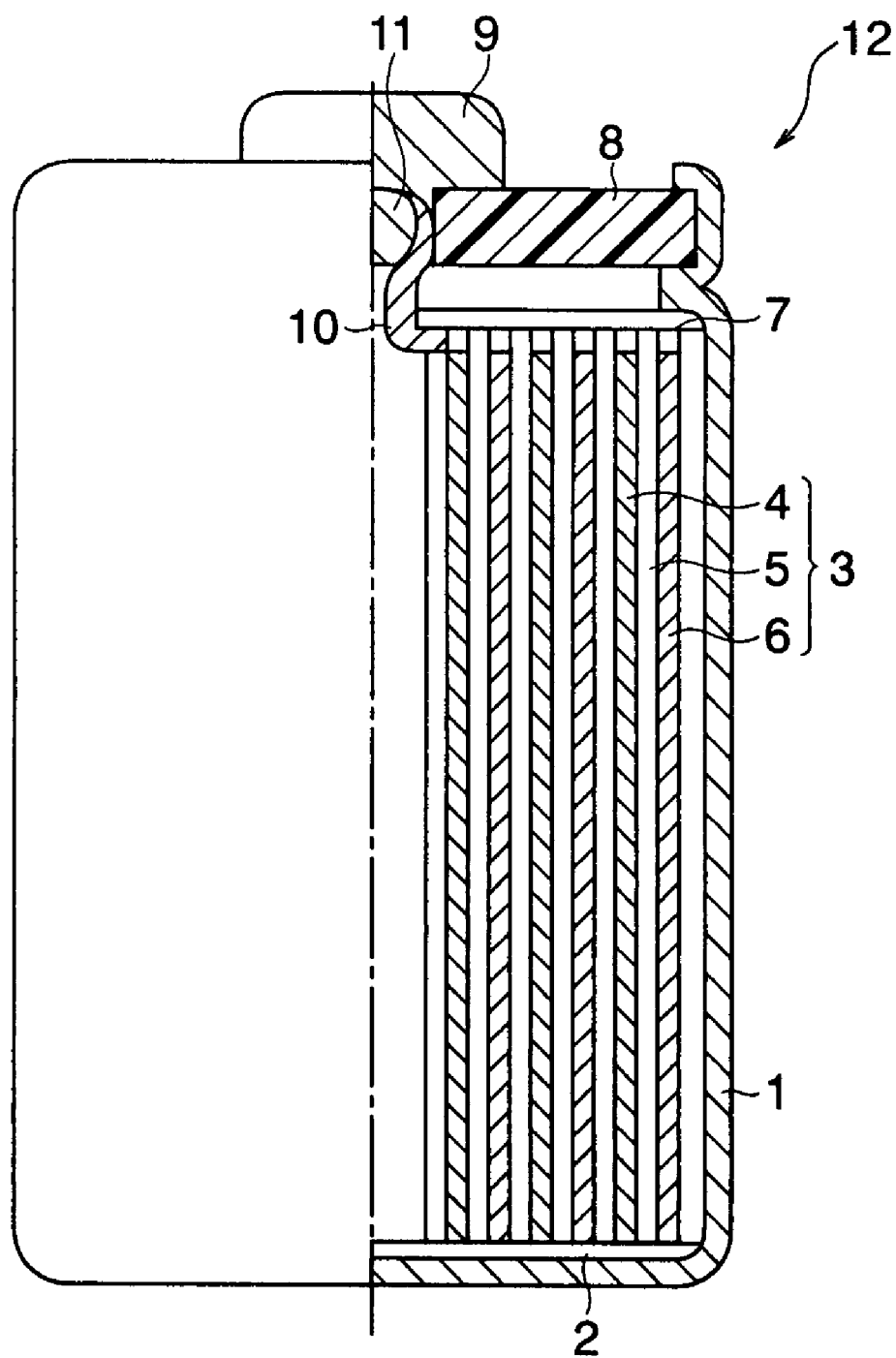
FIG. 4 is a sectional view showing a structure of the non-aqueous electrolyte secondary cell according to one embodiment of the invention.

FIG. 4 is a partially sectional diagram showing the structure of an embodiment applying the non-aqueous electrolyte secondary cell of the invention to a lithium-ion secondary cell. In the drawing, 1 is a cell casing (cell can) formed of stainless steel for example. An insulator 2 is disposed on the bottom of the cell casing 1. The cell casing 1 is formed to have a shape, for example, a bottomed cylindrical shape or a bottomed square tubular shape. The present invention can be applied to both of a cylindrical secondary cell and a square secondary cell. The cell casing 1 also serves as a negative electrode terminal. The cell casing 1 houses an electrode group 3 as an electricity generating element in it.

The electrode group 3 has a structure that a strip-form portion having a positive electrode 4, a separator 5 and a negative electrode 6 laminated in this order is wound to have, for example, a spiral shape, so to have the negative electrode 6 on the outermost portion. The electrode group 3 is not limited to the spiral shape but may have multiple of the positive electrode 4, the separator 5 and the negative electrode 6 laminated in this order. The cell casing 1 accommodating the electrode group 3 in it is filled with a non-aqueous electrolyte. Insulating paper 7 having an opening formed in its center is disposed on the top of the electrode group 3 in the cell casing 1. An insulating sealing plate 8 is disposed in an opening on the top of the cell casing 1. The insulating sealing plate 8 is fluid-tightly fixed to the cell casing 1 by inwardly caulking the vicinity of the top end of the cell casing 1.

A positive electrode terminal 9 is fitted to the center of the insulating sealing plate 8. One end of a positive electrode lead 10 is connected to the positive electrode terminal 9 through a safety valve 11. The other end of the positive electrode lead 10 is connected to the positive electrode 4. The negative electrode 6 is connected to the cell casing 1 as the negative electrode terminal through an unshown negative electrode lead. Thus, a lithium-ion secondary cell 12 is configured as a non-aqueous electrolyte secondary cell.

Then, the positive electrode 4, the separator 5 and the negative electrode 6, which configure the electrode group 3, and the non-aqueous electrolyte will be described in further detail. The positive electrode 4 is produced by suspending the positive electrode active material for a secondary cell of the invention, a conductive agent and a binder in an appropriate solvent, applying the prepared suspended substance onto a collector and drying to have a thin plate.

The conductive agent and the binder to be mixed with the positive electrode active material can be various kinds of materials conventionally used for the non-aqueous electrolyte secondary cell. As the conductive agent, acetylene black, carbon black, graphite or the like is used. As the binder, polytetrafluoroethylene (PTFE), polyvinylidene fluoride (PVDF), ethylene-propylene-diene copolymer (EPDM), styrene-butadiene rubber (SBR) or the like is used. A mixing ratio of the positive electrode active material, the conductive agent and the binder is preferably 80 to 95% by mass of the positive electrode active material, 3 to 20% by mass of the conductive agent and 2 to 7% by mass of the binder. As the collector onto which the suspended substance containing the positive electrode active material, the conductive agent and the binder is applied, for example, an aluminum foil, a stainless steel foil or a nickel foil is used.

Various types of materials and configurations which are conventionally used for the non-aqueous electrolyte secondary cell can be applied to the other cell components such as the separator 5, the negative electrode 6, and the non-aqueous electrolyte. For example, a synthetic resin nonwoven fabric, a polyethylene porous film, a polypropylene porous film or the like is used as the separator 5. The negative electrode 6 is produced by suspending the negative electrode active material and the binder into an appropriate solvent, applying the obtained suspension onto a collector and drying to form a thin plate.

As the negative electrode active material, pyrolytic carbons, pitch/cokes, graphites, vitreous carbons, a calcined material of an organic high polymer such as phenol resin or furan resin, a carbon material such as carbon fiber or activated carbon, a lithium alloy such as metallic lithium or Li—Al alloy, or a polymer such as polyacetylene or polypyrrole which is capable of occluding/releasing lithium ions is used. For the binder, one similar to the positive electrode 5 is used. A mixing ratio of the negative electrode active material and the binder is preferably 90 to 95% by mass of the negative electrode active material and 2 to 10% by mass of the binder. As the collector onto which a suspended substance containing the negative electrode active material and the binder is applied, for example, a foil, mesh, punched metal or lath metal of copper, stainless steel or nickel is used.

Besides, the non-aqueous electrolyte is prepared by dissolving an electrolyte into a non-aqueous solvent. As the non-aqueous solvent, for example, various types of non-aqueous solvents known as a solvent for a lithium-ion secondary cell can be used. The non-aqueous solvent for the non-aqueous electrolyte is not particularly limited, but, for example, a mixture solvent of propylene carbonate or ethylene carbonate with dimethyl carbonate, methylethyl carbonate, diethyl carbonate, γ-butyrolactone, 1,2-dimethoxyethane, 1,2-diethoxy ethane or ethoxy methoxyethane is used. As an electrolyte, lithium salt such as $LiPF_6$, $LiBF_4$, $LiClO_4$, $LiAsF_6$, $LiCF_3SO_3$ is exemplified. An amount of the electrolyte dissolved into the non-aqueous solvent is preferably in a range of 0.5 to 1.5 mol/L (liter).

According to a lithium-ion secondary cell 12 to which the above-described invention is applied, an amount of the particulate metal impurity in the positive electrode active material is reduced, so that the occurrence of a micro-short circuit at the initial charging can be suppressed effectively. Therefore, a production yield of the lithium-ion secondary cell 12 can be enhanced substantially. Besides, the lithium-ion secondary cell 12, in which the particulate metal impurity content is reduced because it becomes a factor of lowering the cell performance, exerts remarkable cell performance.

Then, specific examples of the invention and the evaluated results thereof will be described.

EXAMPLE 1, COMPARATIVE EXAMPLE 1

First, cobalt oxide powder and lithium carbonate were mixed at a prescribed ratio and calcined in the air at 900° C. for four hours. The calcined material was pulverized by an appropriate pulverizer, and sieving was performed to remove massive coarse particles and fine particles. Thus, $LiCoO_2$ powder having an average particle diameter (D50) of 1 to 20 μm was obtained as positive electrode active materials (samples 1 to 3). To produce the positive electrode active material powders, a particulate metal impurity amount was reduced by adjusting a material for a pulverizer, a molding machine, a mixer, a classifier and the like and the operation conditions of the device for producing them.

Then, for the analysis and evaluation of the amount of a particulate metal impurity contained in the above-described individual positive electrode active materials, the individual positive electrode active materials were classified according to the above-described method and conditions. For classification of each positive electrode active material, the conditions were adjusted so that a classification ratio of coarse powder became 2% and the classification precision index κ became about 0.9. The classification was performed by the Turbo-classifier as described above.

Then, each particle size distribution of the powder before the classification, the classified coarse powder and the classified fine powder of each positive electrode active material was measured as described below. First, 0.5 g of each sample was collected, charged into 100 ml of water and stirred. Ultrasonic distribution was performed under conditions of 100 W and 3 min, and a particle size distribution was measured by a MICROTRAC II PARTICLE-SIZE ANALYZER TYPE 7997-10 manufactured by LEEDS & NORTHRUP. The classification precision index κ of each positive electrode active material was determined from the particle size distribution. The classification precision index κ of each sample is specifically shown in Table 3. Specific classified results of sample 1 of Example 1 are shown in Table 1, Table 2, FIG. 1, FIG. 2 and FIG. 3 as described above.

And, as to the positive electrode active materials (samples 1 to 3), the Fe content in the positive electrode active material before the classification and the Fe content in the classified coarse powder were measured as the contents A, B of the impurity metal elements. The contents of the impurity metal elements were measured according to the above-described method. A B/A ratio was determined from the contents A, B of the impurity metal elements and their values. The impurity contents A, B of the individual positive electrode active materials and the B/A ratio are as shown in Table 3.

Meanwhile, as Comparative Example 1 of the present invention, positive electrode active materials (samples 4 to 5) of $LiCoO_2$ powder were produced in the same way as in Example 1 except that the pulverizing conditions and the sieving conditions after the calcination were changed. They were analyzed and evaluated for an amount of the particulate metal impurity in the same way as in Example 1. The results are shown in Table 3.

Using the individual positive electrode active materials according to Example 1 and Comparative Example 1 described above, individual lithium-ion secondary cells were produced. To produce the lithium-ion secondary cells, powder before the classification (coarse powder+fine powder) was used as the positive electrode active material. First, 90% by mass of the positive electrode active material, 6% by mass of graphite as a conductive agent and 4% by mass of polyvinylidene fluoride as a binder were mixed to prepare a positive electrode mixture. The positive electrode mixture was dispersed into N-methyl-2-pyrrolidone to prepare a slurry, which was then applied onto an aluminum foil and dried, and the resultant was compression-molded by a roller pressing machine. The resultant was cut into a prescribed size to obtain a sheet positive electrode.

Meanwhile, 93% by mass of a carbon material and 7% by mass of polyvinylidene fluoride as a binder were mixed to prepare a negative electrode mixture. A sheet negative electrode was produced in the same way as the positive electrode excepting that the prepared negative electrode mixture was used. And, the sheet positive electrode, a separator formed of a microporous polyethylene film and the sheet negative electrode were laminated in this order, and the obtained laminate was wound into a spiral shape to have the negative electrode on the outside so to produce an electrode group. A lead was fitted to the electrode group before housing into a bottomed cylindrical container (cell can), into which a non-aqueous electrolyte was charged to assemble a cylindrical lithium-ion secondary cell. The non-aqueous electrolyte was prepared by dissolving $LiPF_6$ in a concentration of 1 mol/L into a solvent of ethylene carbonate and methylethyl carbonate mixed in 1:1.

Individual cylindrical lithium-ion secondary cells of Example 1 and Comparative Example 1 produced as described above were measured and evaluated for their characteristics as described below. First, as the first charging of the assembled cells, a constant voltage of 4.2V was charged for eight hours in an environment of 20° C. with current limited to 0.6 A. The charged secondary cells were stored at room temperature for ten days, and their voltages were measured. The voltages after the 10-day standing are shown in Table 3.

TABLE 3

| | Sample No. | Classification precision index κ | Fe content before classification A (%) | Fe content of classified coarse powder B (%) | B/A ratio | Voltage 10 days after charging (V) |
|---|---|---|---|---|---|---|
| E1 | 1 | 0.90 | 0.1 | 0.1 | 1.00 | 4.18 |
| | 2 | 0.92 | 0.1 | 0.11 | 1.10 | 4.18 |
| | 3 | 0.93 | 0.1 | 0.13 | 1.30 | 4.16 |
| CE1 | 4 | 0.92 | 0.1 | 0.3 | 3.00 | 3.20 |
| | 5 | 0.91 | 0.1 | 0.6 | 6.00 | 0.20 |

E1: Example 1
CE1: Comparative Example 1

It is apparent from Table 3 that the individual positive electrode active materials according to Example 1 and Comparative Example 1 have substantially the same value of Fe content in the powders before the classification. However, the lithium-ion secondary cells produced from such positive electrode active materials had a little drop of voltage after the 10-day standing in Example 1 but a large drop of voltage in Comparative Example 1. It is because each of the individual positive electrode active materials of Example 1 has a B/A ratio of 1.5 or below and a small content of the particulate metal impurity, but each of the individual positive electrode active materials of Comparative Example 1 has a B/A ratio of exceeding 1.5 and contains a large amount of particulate metal impurity.

Thus, the application of the analysis and evaluation method of the present invention allows to concentrate the particulate metal impurity, which is hardly detected by an ordinary analysis method, on the coarse powder side. As a result, the content of the particulate metal impurity in the whole positive electrode active material can be evaluated effectively by the B/A ratio determined from the impurity content B in the classified coarse powder and the impurity content A in the positive electrode active material before the classification. And, by using the positive electrode active material having a B/A ratio of 1.5 or below as an evaluated result, a lithium-ion secondary cell, which prevents an initial failure, can be obtained with a high reproducibility.

EXAMPLES 2-6, COMPARATIVE EXAMPLES 2-6

Positive electrode active materials (LiCoO$_2$ powder) were produced as samples of Examples 2 to 6 in the same way as in Example 1 described above. At this time, the material for a pulverizer, a molding machine, a mixer, a classifier and the like and the operation conditions of the devices for producing them were adjusted to reduce the amount of the particulate metal impurity.

The amount of the particulate metal impurity contained in the above-described individual positive electrode active material was analyzed and evaluated in the same way as in Example 1. Classification for analysis and evaluation was also conducted under the same conditions as in Example 1. For the contents A, B of the impurity metal elements in the powder before the classification and the classified coarse powder, a Cu content in Example 2, a Zn content in Example 3, a Cr content in Example 4, a Ca content in Example 5 and an Mg content in Example 6 were measured. The measured results of the individual Examples are shown in Tables 4 to 8.

Meanwhile, as Comparative Examples 2 to 6 of the present invention, positive electrode active materials of LiCoO$_2$ powder were produced in the same way as in Examples 2 to 6 except that the pulverizing conditions and the sieving conditions after the calcinations were changed. They were analyzed and evaluated on an amount of the particulate metal impurity in the same way as in Examples 2 to 6. The results are as shown in Table 4 to Table 8.

The individual positive electrode active materials of Examples 2 to 6 and Comparative Examples 2 to 6 were used to produce lithium-ion secondary cells in the same way as in Example 1. The individual lithium-ion secondary cells were charged under the same conditions as in Example 1 and left standing for ten days in the same way, and their voltages were measured. The measured results are shown in Table 4 to Table 8.

TABLE 4

| | Sample No. | Classification precision index κ | Cu content before classification A (ppm) | Cu content of classified coarse powder B (ppm) | B/A ratio | Voltage 10 days after charging (V) |
|---|---|---|---|---|---|---|
| E2 | 6 | 0.91 | 25 | 24 | 0.96 | 4.18 |
| | 7 | 0.89 | 24 | 25 | 1.04 | 4.16 |
| | 8 | 0.90 | 25 | 33 | 1.32 | 4.13 |
| CE2 | 9 | 0.91 | 23 | 38 | 1.65 | 2.20 |
| | 10 | 0.91 | 25 | 40 | 1.60 | 1.00 |

E2: Example 2
CE2: Comparative Example 2

TABLE 5

| | Sample No. | Classification precision index κ | Zn content before classification A (ppm) | Zn content of classified coarse powder B (ppm) | B/A ratio | Voltage 10 days after charging (V) |
|---|---|---|---|---|---|---|
| E3 | 11 | 0.92 | 15 | 16 | 1.06 | 4.19 |
| | 12 | 0.91 | 14 | 15 | 1.07 | 4.17 |
| | 13 | 0.89 | 15 | 21 | 1.40 | 4.12 |
| CE3 | 14 | 0.91 | 14 | 28 | 2.00 | 3.20 |
| | 15 | 0.92 | 16 | 33 | 2.06 | 2.00 |

E3: Example 3
CE3: Comparative Example 3

TABLE 6

| | Sample No. | Classification precision index κ | Cr content before classification A (ppm) | Cr content of classified coarse powder B (ppm) | B/A ratio | Voltage 10 days after charging (V) |
|---|---|---|---|---|---|---|
| E4 | 16 | 0.92 | 12 | 12 | 1.00 | 4.19 |
| | 17 | 0.88 | 13 | 14 | 1.08 | 4.18 |
| | 18 | 0.89 | 12 | 15 | 1.25 | 4.15 |
| CE4 | 19 | 0.91 | 12 | 22 | 1.83 | 3.10 |
| | 20 | 0.90 | 13 | 28 | 2.15 | 2.50 |

E4: Example 4
CE4: Comparative Example 4

TABLE 7

| | Sample No. | Classification precision index κ | Ca content before classification A (ppm) | Ca content of classified coarse powder B (ppm) | B/A ratio | Voltage 10 days after charging (V) |
|---|---|---|---|---|---|---|
| E5 | 21 | 0.91 | 210 | 220 | 1.04 | 4.18 |
| | 22 | 0.89 | 220 | 220 | 1.00 | 4.17 |
| | 23 | 0.92 | 220 | 240 | 1.09 | 4.15 |
| CE5 | 24 | 0.91 | 200 | 410 | 2.05 | 2.80 |
| | 25 | 0.92 | 210 | 580 | 2.76 | 1.00 |

E5: Example 5
CE5: Comparative Example 5

TABLE 8

| | Sample No. | Classification precision index κ | Mg content before classification A (ppm) | Mg content of classified coarse powder B (ppm) | B/A ratio | Voltage 10 days after charging (V) |
|---|---|---|---|---|---|---|
| E6 | 26 | 0.92 | 8 | 8 | 1.00 | 4.19 |
| | 27 | 0.90 | 7 | 8 | 1.14 | 4.17 |
| | 28 | 0.88 | 10 | 9 | 0.90 | 4.14 |

TABLE 8-continued

| | | Analyzed and evaluated results of particulate metal impurity | | | | |
|---|---|---|---|---|---|---|
| | Sample No. | Classification precision index κ | Mg content before classification A (ppm) | Mg content of classified coarse powder B (ppm) | B/A ratio | Voltage 10 days after charging (V) |
| CE6 | 29 | 0.87 | 9 | 18 | 2.00 | 2.50 |
| | 30 | 0.91 | 7 | 37 | 5.29 | 0.80 |

E6: Example 6
CE6: Comparative Example 6

It is apparent from Table 4 to Table 8 that the lithium-ion secondary cell prepared from each positive electrode active material with the B/A ratio of 1.5 or below according to Examples 2 to 6 had a little voltage drop after the 10-day standing. Thus, even when the positive electrode active materials having Cu, Zn, Cr, Ca or Mg with the B/A ratio of 1.5 or below as an impurity metal element were used, a lithium-ion secondary cell, which prevents an initial failure, can be obtained with a high reproducibility.

Fe, Cu, Zn, Cr, Ca and Mg were used as the impurity metal elements in Examples 1 to 6 described above. Such elements were used as the impurity metal elements which were especially easily mingled because the device for producing the positive electrode active material was often made of an iron alloy such as stainless steel as described above. The same effects can be obtained by using other metal elements when the ratio (B/A ratio) of the content of the impurity metal element is adjusted to 1.5 or below.

EXAMPLE 7, COMPARATIVE EXAMPLE 7

In the same way as in Example 1 and Comparative Example 1 described above, the positive electrode active materials (LiCoO$_2$ powder) were produced as the samples of Example 7 and Comparative Example 7. The amount of the particulate metal impurity contained in each positive electrode active material was analyzed and evaluated in the same way as in Example 1. Classification was adjusted so to have the classification precision index κ of about 0.8. The contents A, B of the impurity metal elements in the powder before the classification and the classified coarse powder were measured for an Fe content in the same way as in Example 1. The measured results in Example 7 and Comparative Example 7 are shown in Table 9.

The respective positive electrode active materials of Example 7 and Comparative Example 7 were used to produce individual lithium-ion secondary cells in the same way as in Example 1. The individual lithium-ion secondary cells were charged under the same conditions as in Example 1, and their voltages were measured after having left standing for ten days. The measured results are shown in Table 9.

TABLE 9

| | | Analyzed and evaluated results of particulate metal impurity | | | | |
|---|---|---|---|---|---|---|
| | Sample No. | Classification precision index κ | Fe content before classification A (%) | Fe content of classified coarse powder B (%) | B/A ratio | Voltage 10 days after charging (V) |
| E7 | 31 | 0.79 | 0.1 | 0.10 | 1.00 | 4.17 |
| | 32 | 0.81 | 0.1 | 0.11 | 1.10 | 4.19 |
| | 33 | 0.82 | 0.1 | 0.10 | 1.00 | 4.18 |
| CE7 | 34 | 0.80 | 0.1 | 0.2 | 2.00 | 2.80 |
| | 35 | 0.81 | 0.1 | 0.3 | 3.00 | 0.50 |

E7: Example 7
CE7: Comparative Example 7

It is apparent from Table 9 that the lithium-ion secondary cell can be prevented from an initial failure by classifying to have the classification precision index κ of 0.7 or more and using the positive electrode active material having the B/A ratio of 1.5 or below determined according to the results. It is seen that the Fe content in the classified coarse powder is slightly low because the classification precision index κ in Example 7 and Comparative Example 7 is set to be somewhat lower than in Example 1. It is because the concentrated level of the particulate metal impurity into the classified coarse powder was lowered to some extent. It is seen that an initial failure of the lithium-ion secondary cell can be prevented securely by using the positive electrode active material having the B/A ratio of 1.5 or below based on the classification with the classification precision index κ of 0.7 or more.

EXAMPLE 8, COMPARATIVE EXAMPLE 8

Nickel hydroxide powder and lithium hydroxide powder were mixed in a prescribed ratio and calcined in the air at 700° C. for six hours. This calcined material was pulverized by an appropriate pulverizer, and sieving was performed to remove massive coarse particles and fine particles. Thus, a positive electrode active material of LiNiO$_2$ powder was obtained. To produce the positive electrode active material, the material for a pulverizer, a molding machine, a mixer, a classifier and the like and the operation conditions of the devices for producing them were adjusted to reduce the amount of the particulate metal impurity.

The amount of the particulate metal impurity contained in the positive electrode active material described above was analyzed and evaluated in the same way as in Example 1. Classification for analysis and evaluation was also performed under the same conditions as in Example 1. The contents A, B of the impurity metal elements in the powder before the classification and the classified coarse powder were determined on Fe in the same way as in Example 1. The results are shown in Table 10.

Meanwhile, as Comparative Example 8 of the present invention, a positive electrode active material of $LiNiO_2$ powder was produced in the same way as in Example 8 except that the pulverizing conditions and the sieving conditions after the calcination were changed. This positive electrode active material was also analyzed and evaluated on the amount of the particulate metal impurity in the same way as in Example 8. The results are shown in Table 10.

The individual positive electrode active materials ($LiNiO_2$ powder) according to Example 8 and Comparative Example 8 were used to produce lithium-ion secondary cells in the same way as in Example 1. The individual lithium-ion secondary cells were charged in the same way as in Example 1 and their voltages after ten-day standing were measured. The measured results are shown in Table 10.

priate pulverizer, and sieving was performed to remove massive coarse particles and fine particles. Thus, the positive electrode active material of $LiMn_2O_4$ powder was obtained. To produce the positive electrode active material, the material for a pulverizer, a molding machine, a mixer, a classifier and the like and the operation conditions of the devices for producing them were adjusted to reduce the amount of the particulate metal impurity.

The amount of the particulate metal impurity contained in the positive electrode active material described above was analyzed and evaluated in the same way as in Example 1. Classification for analysis and evaluation was also performed under the same conditions as in Example 1. The contents A, B of the impurity metal elements in the powder before the classification and the classified coarse powder were determined on Fe in the same way as in Example 1. The results are shown in Table 11.

Meanwhile, as Comparative Example 9 of the present invention, a positive electrode active material of $LiMn_2O_4$ powder was produced in the same way as in Example 9 except that the pulverizing conditions and the sieving conditions after the calcination were changed. This positive electrode

TABLE 10

| | Sample No. | Classification precision index κ | Fe content before classification A (%) | Fe content of classified coarse powder B (%) | B/A ratio | Voltage 10 days after charging (V) |
|---|---|---|---|---|---|---|
| E8 | 36 | 0.91 | 0.1 | 0.11 | 1.10 | 4.19 |
| CE8 | 37 | 0.91 | 0.1 | 0.30 | 3.00 | 2.85 |

E8: Example 8
CE8: Comparative Example 8

It is apparent from Table 10 that even when the positive electrode active material of $LiNiO_2$ is used, an initial failure of the lithium-ion secondary cell can be retarded when the $LiNiO_2$ powder has a B/A ratio of 1.5 or below.

EXAMPLE 9, COMPARATIVE EXAMPLE 9

Manganese dioxide powder and lithium carbonate were mixed in a prescribed ratio and calcined in the air at 800□ for six hours. The calcined material was pulverized by an approactive material was also analyzed and evaluated on the amount of the particulate metal impurity in the same way as in Example 9. The results are shown in Table 11.

The individual positive electrode active materials ($LiMn_2O_4$ powder) according to Example 9 and Comparative Example 9 were used to produce lithium-ion secondary cells in the same way as in Example 1. The individual lithium-ion secondary cells were charged in the same way as in Example 1 and their voltages after ten-day standing were measured. The measured results are shown in Table 11.

TABLE 11

| | Sample No. | Classification precision index κ | Fe content before classification A (%) | Fe content of classified coarse powder B (%) | B/A ratio | Voltage 10 days after charging (V) |
|---|---|---|---|---|---|---|
| E9 | 38 | 0.92 | 0.1 | 0.11 | 1.10 | 4.18 |
| CE9 | 39 | 0.92 | 0.1 | 0.40 | 4.00 | 1.92 |

E9: Example 9
CE9: Comparative Example 9

It is apparent from Table 11 that even when the positive electrode active material of LiMn$_2$O$_4$ is used, an initial failure of the lithium-ion secondary cell can be retarded when the LiMn$_2$O$_4$ powder has a B/A ratio of 1.5 or below.

In the above-described Examples, the lithium-ion secondary cells were produced by using the positive electrode active material before the classification, but the same effects can be obtained when the lithium-ion secondary cell is produced by using the fine powder obtained by the classification (removing the classified coarse powder from the positive electrode active material before the classification).

Industrial Applicability

It is apparent from the above-described embodiments that the present invention has established the analysis and evaluation method on factors (such as a particulate metal impurity) of degrading the cell performance and production yield. And, the amount of the particulate metal impurity in the positive electrode active material is evaluated according to the analysis and evaluation method. Therefore, the production yield and cell performance of the non-aqueous electrolyte secondary cell can be improved with a high reproducibility by using the positive electrode active material for a secondary cell satisfying the conditions of the invention.

What is claimed is:

1. A method for analysis of a positive electrode active material for a non-aqueous electrolyte secondary cell, comprising:
    preparing a powdery metal oxide as the positive electrode active material;
    classifying the powdery metal oxide by using a difference in particle diameter and density of its component particles to obtain a classified coarse powder having a classification ratio in a range of 0.1 to 5% and a remaining powder without the classified coarse powder, wherein the classification ratio is a mass ratio of an amount of the classified coarse powder to a total amount of the powdery metal oxide;
    measuring a content A of an impurity metal element in the powdery metal oxide before classifying and a content B of an impurity metal element in the classified coarse powder obtained by classifying;
    comparing the content B of the impurity metal element with the content A of the impurity metal element in order to evaluate an amount of particulate metal impurity contained in the powdery metal oxide before classifying; and
    selecting a whole of the powdery metal oxide containing the classified coarse powder and the remaining powder, of which a ratio (B/A) of the content B of the impurity metal element to the content A of the impurity metal element is 0.9 or more and 1.4 or less, as the positive electrode active material,
    wherein the powdery metal oxide is classified to have a classification precision index κ of 0.7 or more,
    wherein the classification precision index κ is expressed with a ratio ($D_{p25}/D_{p75}$), where $D_{p25}$ is a particle diameter (μm) when a partial classification efficiency in a partial classification efficiency curve is 25% and $D_{p75}$ is a particle diameter (μm) when the partial classification efficiency in the partial classification efficiency curve is 75%.

2. The analysis method according to claim 1, wherein the powdery metal oxide is classified by a classifier based on a balance between centrifugal force and fluid resistance by a forced vortex.

3. The analysis method according to claim 1, wherein the powdery metal oxide contains lithium (Li) and at least one element selected from the group consisting of cobalt (Co), nickel (Ni) and manganese (Mn).

4. The analysis method according to claim 1, wherein the powdery metal oxide comprises at least one composite metal oxide selected from the general formulae:

$LiA_aO_x$ (where, A is at least one element selected from the group consisting of Co, Ni and Mn, a is in a range of 0.8≦a≦1.1, and x is in a range of 1.6≦x≦2.4), and $LiB_bO_y$ (where, B is at least one element selected from the group consisting of Mn, Co and Ni, and b is in a range of 1.5≦b≦2.1, and y is in a range of 3.6≦y≦4.4).

5. The analysis method according to claim 1, wherein the impurity metal element is at least one element (excepting the metal elements constituting the powdery metal oxide) selected from the group consisting of Mg, Ca, Ba, Sr, Sc, Y, Ti, Zr, Hf, V, Cr, Nb, Mo, Ta, W, Mn, Fe, Co, Ni, Cu, Zn, Ga, Ge, Tc, Ru, Rh, Pd, Ag, Cd, In, Sn, Sb, Re, Os, Ir, Tl, Pb and Bi.

6. The analysis method according to claim 1, wherein the impurity metal element is at least one element (excepting the metal elements constituting the powdery metal oxide) selected from the group consisting of Fe, Cr, Cu, Zn, Mg and Ca.

7. A method for manufacturing a non-aqueous electrolyte secondary cell, comprising:
    producing a positive electrode by using the powdery metal oxide selected as the positive electrode active material by the analysis method according to claim 1; and
    producing the non-aqueous electrolyte secondary cell by using the positive electrode, a negative electrode disposed with the positive electrode through a separator, a cell casing configured to accommodate the positive electrode, the separator and the negative electrode, and a non-aqueous electrolyte filling in the cell casing.

8. The manufacturing method according to claim 7, wherein the powdery metal oxide contains lithium (Li) and at least one element selected from the group consisting of cobalt (Co), nickel (Ni) and manganese (Mn).

9. The manufacturing method according to claim 7, wherein the powdery metal oxide comprises at least one composite metal oxide selected from the general formulae:

$LiA_aO_x$ (where, A is at least one element selected from the group consisting of Co, Ni and Mn, a is in a range of 0.8≦a≦1.1, and x is in a range of 1.6≦x≦2.4), and $LiB_bO_y$ (where, B is at least one element selected from the group consisting of Mn, Co and Ni, and b is in a range of 1.5≦b≦2.1, and y is in a range of 3.6≦y≦4.4).

10. The manufacturing method according to claim 7, wherein the secondary cell is a lithium-ion secondary cell.

* * * * *